(12) United States Patent
Fukao et al.

(10) Patent No.: US 6,231,090 B1
(45) Date of Patent: May 15, 2001

(54) TUBULAR JOINT

(75) Inventors: Hitoshi Fukao; Hideo Matsuura; Osamu Ozaki, all of Komaki (JP)

(73) Assignee: Kunimorikagaku Co. Ltd., Nagoya (JP)

( * ) Notice: Subject to any disclaimer, the term of this patent is extended or adjusted under 35 U.S.C. 154(b) by 0 days.

(21) Appl. No.: 09/282,379

(22) Filed: Mar. 31, 1999

(51) Int. Cl.$^7$ ............................................. F16L 17/00
(52) U.S. Cl. ................................ 285/340; 285/369
(58) Field of Search .................. 285/340, 319, 285/369, 383

(56) References Cited

U.S. PATENT DOCUMENTS

| | | | |
|---|---|---|---|
| 4,146,254 | * 3/1979 | Turner et al. | 285/105 |
| 4,421,347 | * 12/1983 | Kantor | 285/369 |
| 4,810,009 | * 3/1989 | Legris | 285/340 |
| 5,681,062 | * 10/1997 | Fukao et al. | 285/340 |

FOREIGN PATENT DOCUMENTS

| | | |
|---|---|---|
| 60310 | * 9/1982 | (EP) . |
| 1236907 | * 6/1971 | (GB) . |
| 1312782 | * 4/1973 | (GB) . |
| 1477074 | * 6/1977 | (GB) . |
| 2075141 | * 11/1981 | (GB) . |
| 1-206196 | * 8/1989 | (JP) ........................... 285/340 |
| 10-153287 | * 6/1998 | (JP) . |

* cited by examiner

*Primary Examiner*—Teri Pham Luu
(74) *Attorney, Agent, or Firm*—Frishauf, Holtz, Goodman, Langer & Chick, P.C.

(57) ABSTRACT

A tubular joint adapted to connect a pair of pipes is formed by a joint body made of a synthetic resin having a pair of connection ports integrally formed on respective sides thereof. An engaging groove is formed around an axial line on an outside circumferential surface of each of the connection ports, and a synthetic resin-made fall-out preventing member is fixed at an end portion of each of the connection ports. An outside cylindrical portion of each of the fall-out preventing members has a tapered surface adapted to enable the fall-out preventing members to be press-fitted onto the respective connection ports, and includes a plurality of engaging portions that are engaged with the engaging groove formed around the axial line on the outside circumferential surface of each of the connection ports as the fall-out preventing members are press-fitted thereon. And an inside cylindrical portion of each of the fall-out preventing members extends toward a center of the connection ports in an inclined manner, and includes a plurality of fall-out stoppers whose tip ends are shaped so as to be engaged in a groove portion formed around an axial line on the outside circumferential surface of the respective pipes to be connected as the pipes are inserted and fitted in the connection ports.

3 Claims, 8 Drawing Sheets

TUBULAR JOINT

BACKGROUND OF THE INVENTION

This invention relates to a tubular joint for connecting tubes or pipes to each other.

In the prior art of the present invention, a tubular joint for connecting tubes to let fluid flow such as air piping or water supply pipes or for connecting tubes to contain cables such as electric wires or the like comprises a joint body and connecting ports formed on both ends of the joint body, each of which connecting ports has an inner diameter substantially equal to an outer diameter of the tubes to be connected. To connect the tubes to each other, the tubes are coated with adhesive agent over the outer then inserted into each of the connection ports.

However, when the tubes disposed within a narrow space such as a recess behind a wall are connected by this tubular joint, the connecting work has not been efficient because the coating work of Further, it has been difficult to apply the adhesive agent all over the outer periphery of the tube, so that the tubes can not always air tightly connected to each other.

As a connecting method which does not use an adhesive agent, it is known to heat and melt one end of the tube inserted in the connection port. However, this method requires high skill because it is necessary to heat all of the connecting area uniformly, so that the connecting work using this method is also difficult and time consuming.

SUMMARY OF THE INVENTION

The applicant of the present invention proposed a tubular joint in Japanese patent application No. 326097/1996 in order to solve the above mentioned defects in the prior art. The tubular joint includes a fall-out preventing member, a cam body and a pressing member provided on a connection port thereof having an inner diameter substantially equal to an outer diameter of a tube.

The fall-out preventing member comprises a ring-like plate with a width substantially equal to that of the end surface of the connection port, which ring-like plate is engaged with the end part of the connection port. The ring-like plate is provided with a number of fall-out stoppers extending in the axial direction from the inner peripheral edge thereof. The fall-out stoppers are formed to be elastically deformable, having a claw on each end thereof which claw is bent in centrifugal direction and then bent in centripetal direction.

The cam body has a ring-like part inserted in the connection port so as to be axially movable therein. The ring-like part has a cam surface on the inner area of the inside end which cam surface has circular sections of which diameters are gradually increased in the inserting direction. Further, the ring-like part is provided with contact parts on the outside end thereof so that contact parts may extend outward through respective notched parts formed on the fall-out preventing member and may be located between the mutual fall-out stoppers.

The pressing member is adapted to make the contact parts of the cam body move from a release position where the contact parts are projected out of the connection port to a pressing position within the connection port in the condition that the end part of a tube to be connected has been inserted in the connection port.

The operation of this tubular joint is as follows. In the condition that the pressing member has been moved to the release position, the end part of the tube to be connected is inserted into the connection port. Then, the pressing member is moved to the pressing position and thereby the cam body is moved into the connection port. As a result, the cam surface makes the fall-out stoppers elastically deform and the claws are stuck against the outer surface of the tube.

However, in this tubular joint, the fall-out preventing member was made of metallic material, so that the manufacturing cost was high. Also, in this tubular joint, when the tubes were reused as raw material for synthetic resin after withdrawal of the tubes, it was necessary to remove the fall-out preventing members from the joint body and this work cost much labor, so that the efficiency of reuse was inferior.

Accordingly, the present invention has been developed in order to solve the above mentioned defects and an object of the present invention is to provide a tubular joint which is capable of connecting tubes to each other with high air tightness.

Another object of the present invention is to provide a tubular joint which can be manufactured in low cost.

A further object of the present invention is to provide a tubular joint which has a superior efficiency of reuse when the tubes including the tubular joints are reused as raw material for synthetic resin.

To accomplish those objects, a tubular joint adapted to connect a pair of pipes is formed by a joint body made of a synthetic resin having a pair of connection ports integrally formed on respective sides thereof.

An engaging groove is formed around an axial line on an outside circumferential surface of each of the connection ports, and a synthetic resin-made fall-out preventing member is fixed at an end portion of each of the connection ports. An outside cylindrical portion of each of the fall-out preventing members has a tapered surface adapted to enable the fall-out preventing members to be press-fitted onto the respective connection ports, and includes a plurality of engaging portions that are engaged with the engaging groove formed around the axial line on the outside circumferential surface of each of the connection ports as the fall-out preventing members are press-fitted thereon. And an inside cylindrical portion of each of the fall-out preventing members extends toward a center of the connection ports in an inclined manner, and includes a plurality of fall-out stoppers whose tip ends are shaped so as to be engaged in a groove portion formed around an axial line on the outside circumferential surface of the respective pipes to be connected as the pipes are inserted and fitted in the connection ports.

DETAILED DESCRIPTION OF THE PREFERRED EMBODIMENT

Referring to the attached drawings, embodiments of the present invention will be described hereinafter.

The First Embodiment

Figure 1:
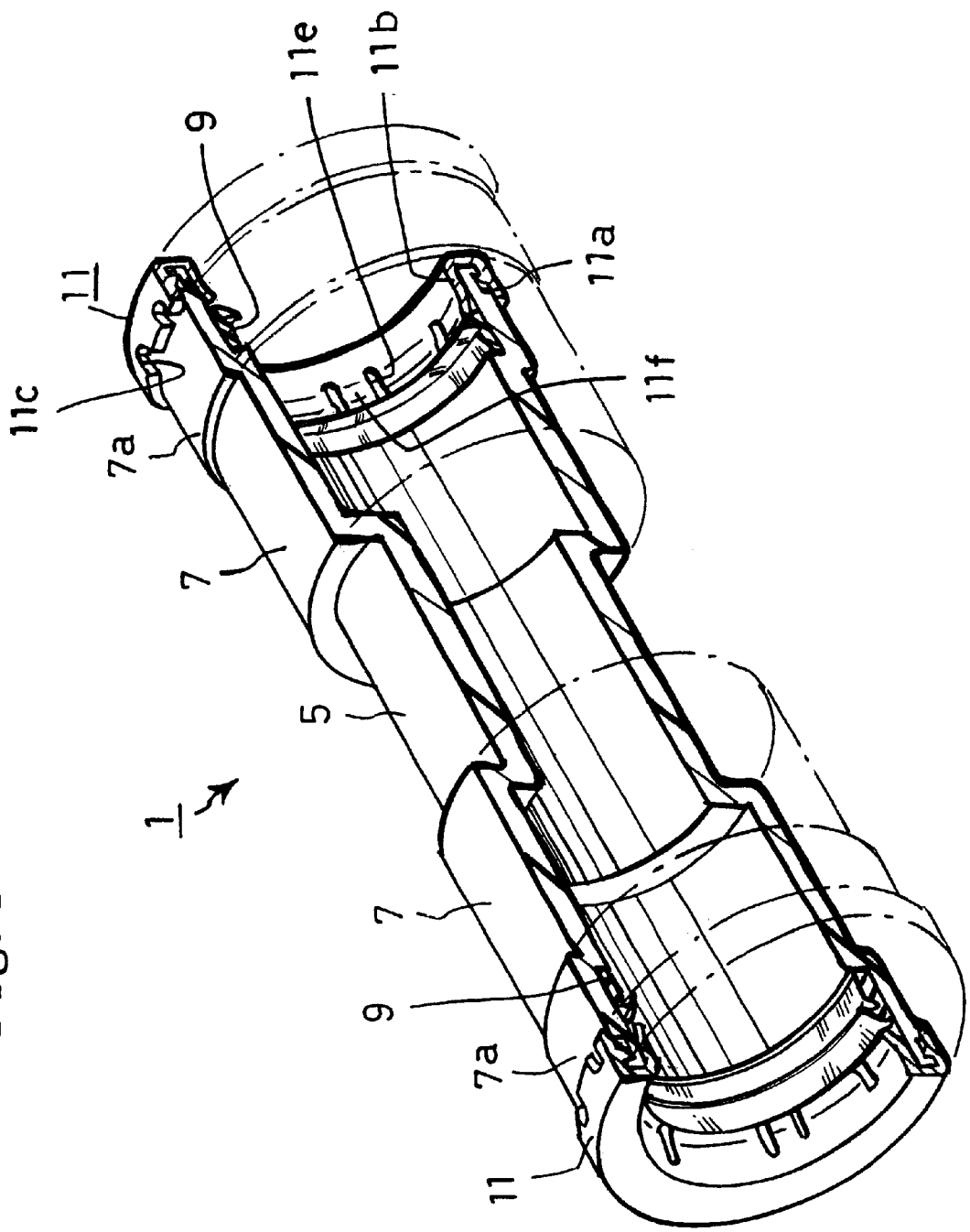
FIG. 1 is a general perspective view of a tubular joint according to the invention.
Figure 2:
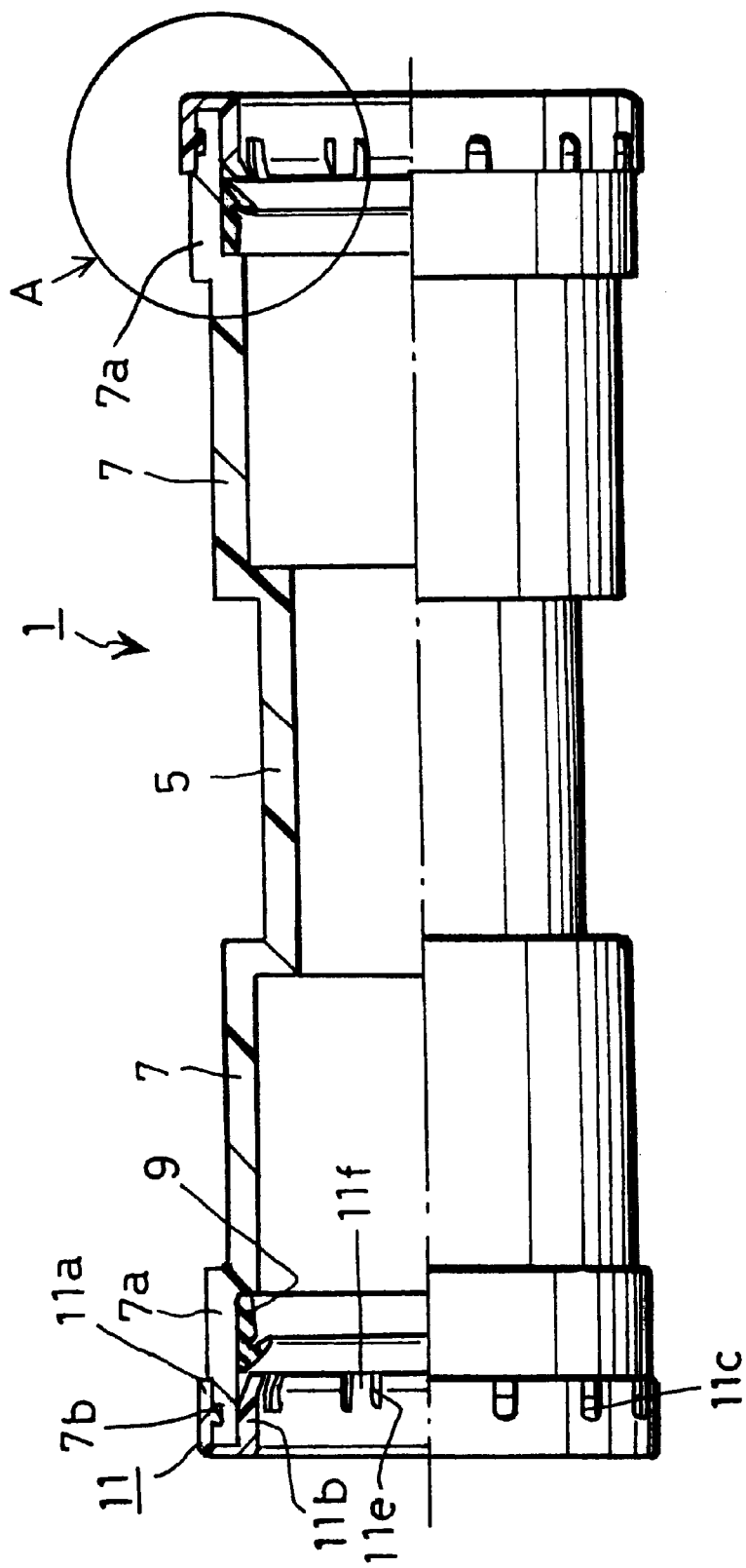
FIG. 2 is a longitudinal sectional view of a tubular joint according to the invention.
Figure 3:
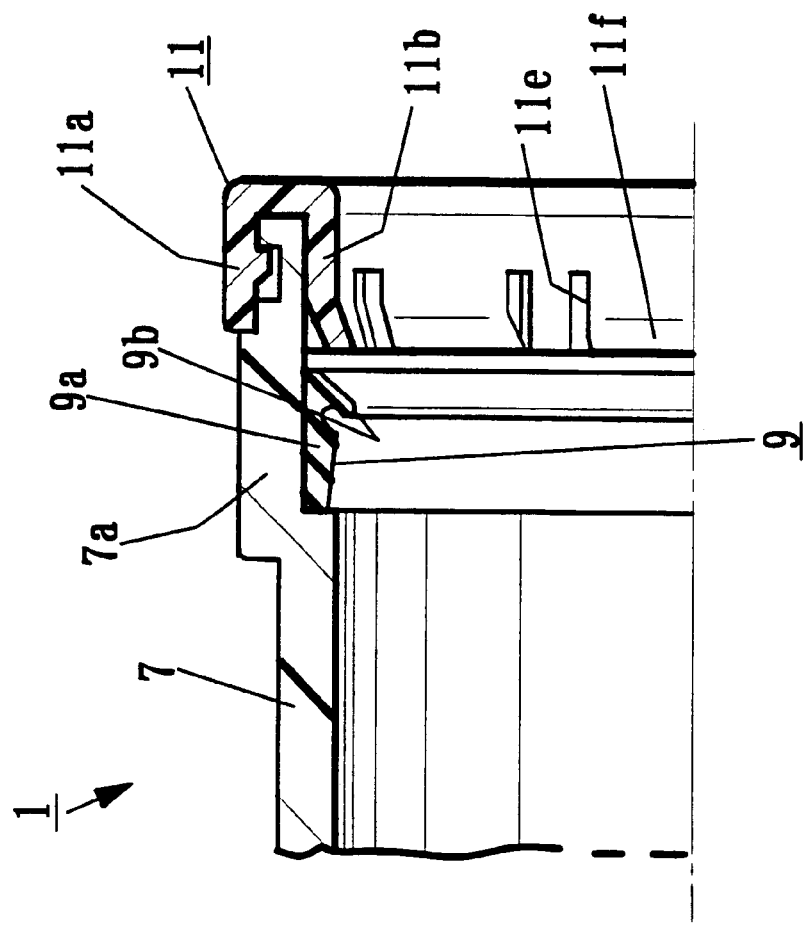
FIG. 3 is an enlarged view of an area A in FIG. 2.

In FIG. 1 to FIG. 3, there is shown a tubular joint 1 that is formed of synthetic resin of olefin series or polyacetal series or formed of compound reinforced resin containing reinforcing fibers such as glass fiber, carbon fiber in the above described kinds of synthetic resin. A joint body 5 of the tubular joint 1 has an inner diameter substantially equal to an inner diameter of a tube 3 to be connected. On both ends of the joint body 5 are integrally formed connection ports 7 each of which has an inner diameter substantially equal to an outer diameter of the tube 3.

On the end part of each connection port 7 is integrally formed an enlarged part 7a and on the inside periphery of the enlarged part 7a is integrally and circumferentially formed a sealing member 9 according to a manner which will be described below. The sealing member 9 comprises a base 9a stuck on the inside periphery of the enlarged part 7a and a sealing flap 9b extending in a slanting manner toward the center line of the enlarged part 7a and also toward the joint body 5. The sealing member 9 is integrally formed on the inside periphery of the enlarged part 7a by injection molding of elastomer resin.

On the outside periphery of each enlarged part 7a is circumferentially formed an engaging groove 7b as a receptive part. A resin-made fall-out preventing member 11 is fitted to the end part of each enlarged part 7a. The resin-made fall-out preventing member 11 is made of, for example, olefin or polyacetal synthetic resin similar to that of the joint body 5 or made of compound reinforced resin containing reinforcing fibers in the above described kinds of synthetic resin. The resin-made fall-out preventing member 11 comprises an outside cylindrical part 11a and an inside cylindrical part 11b both of which are fitted on the end part of the enlarged part 7a.

Figure 5:
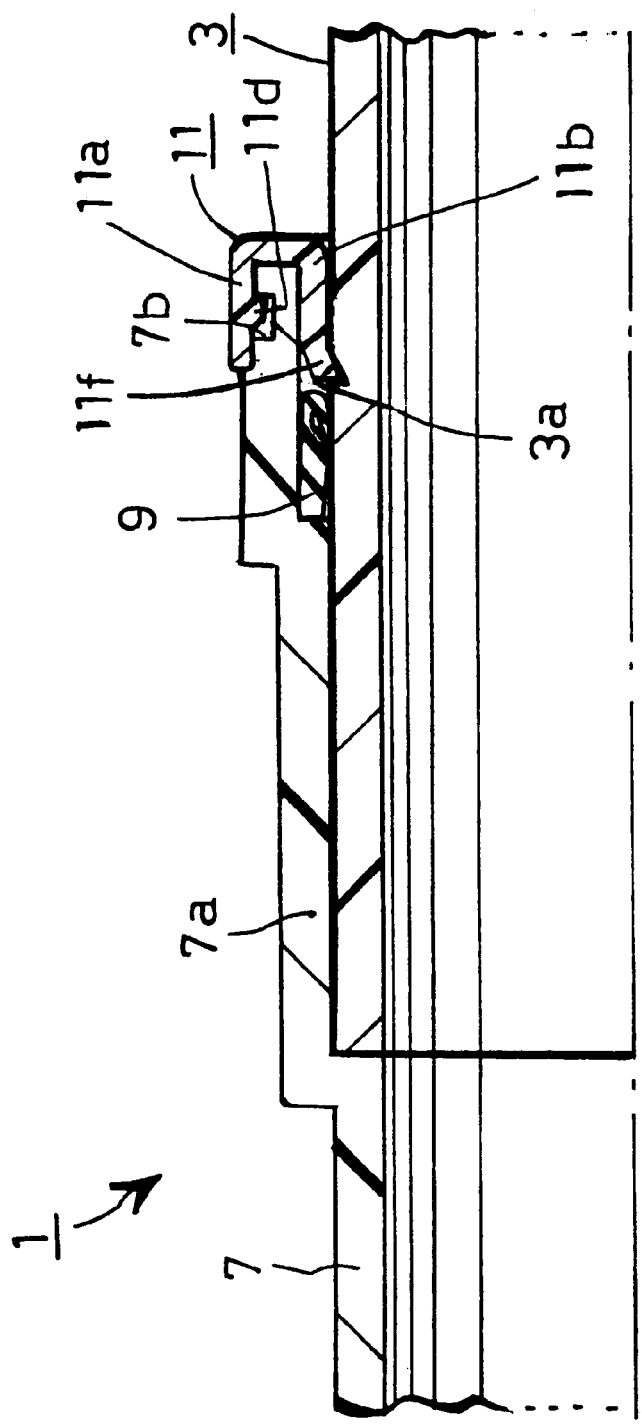
FIG. 5 is an enlarged sectional view of both tubes 3 connected by a tubular joint according to the invention.

On the inner surface of the outside cylindrical part 11a is integrally formed an engaging claw 11d (see FIG. 5) that is adapted to engage with the engaging groove 7b, and circumferentially formed on the outer surface of the cylindrical part 11a are notched parts 11c each having a required width and being spaced at equal intervals. The outside cylindrical part 11a is made elastically deformable because of the notched parts 11c. The engaging claw 11d is formed so that the front side thereof facing the enlarged part 7a has a tapered surface and the other side in upright surface.

On the inside cylindrical part 11b are circumferentially formed notched parts 11e at equal intervals. The inside cylindrical part 11b except the notched parts 11e is provided with fall-out stopper 11f which in a slanting manner extends toward the center line of the enlarged part 7a and also toward the joint body 5. The inside cylindrical part 11b is adapted to be elastically deformable so as to enlarge its diameter owing to the notched parts 11e.

Next, the operation of connecting both the tubes 3 using the tubular joint 1 will be described.

Figure 4:
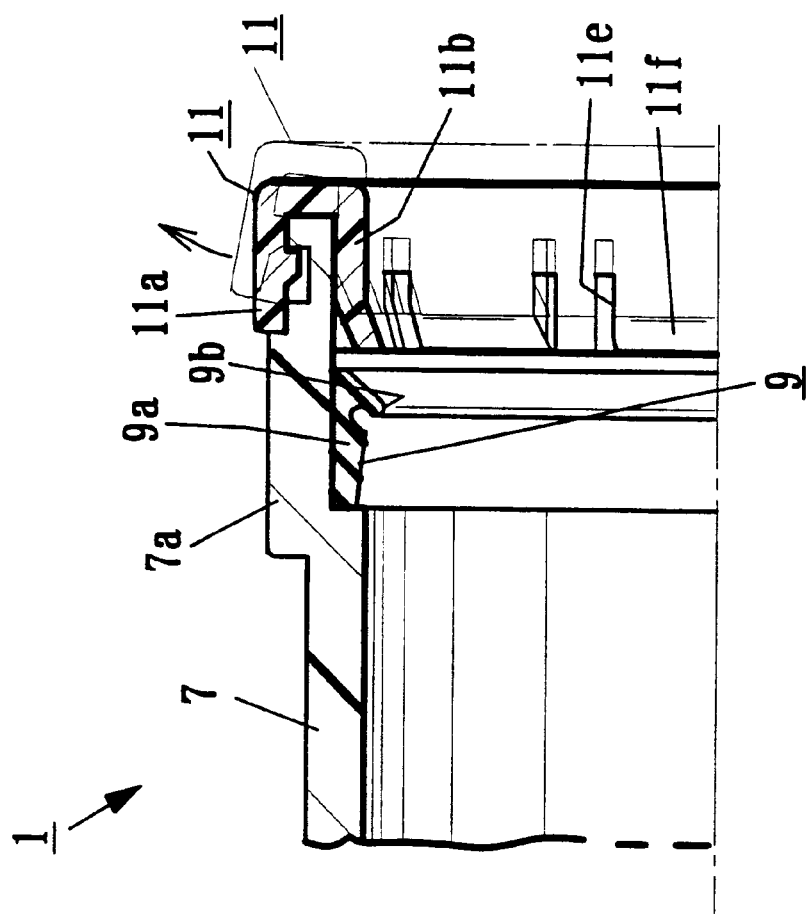
FIG. 4 is an enlarged partial section of a fitted resin-made fall-out preventing member according to the invention.

First, the fitting process of the resin-made fall-out preventing member 11 will be described. As shown in FIG. 4, the resin-made fall-out preventing member 11 is pressed into the enlarged part 7a of each connection port 7 where the sealing member 9 is integrally formed on the inner periphery of the enlarged part 7a. The engaging claw 11d of the outside cylindrical part 11a is elastically deformed so as to enlarge its diameter according to slidable contact with the outer periphery of the end part of the enlarged part 7a and thereafter engaged with the engaging groove 7b so that the resin-made fall-out preventing member 11 is prevented from falling out of the enlarged part 7a. At this time, the fall-out stopper 11f is positioned in the interior of the enlarged part 7a.

Next, on the outer periphery of the end part of the tube 3 to be connected is circumferentially formed an engaging groove 3a with a triangular section. When the tube 3 is pressed into the connection port 7 of the tubular joint 1, the sealing flap 9b and the fall-out stopper 11f are elastically deformed so as to enlarge their diameters owing with slidable contact to the outer periphery of the tube 3 when the tube 3 is inserted.

When the end of the tube 3 is brought into contact with a boundary surface of the enlarged part 7a in the connection port 7 and a press-insertion is restricted, the sealing flap 9b is brought into contact with the outer periphery of the end part of the tube 3 by the elastic force thereof to make an air-tight connection between the tubular joint 1 and the tube 3. Also, the fall-out stopper 11f is engaged with the engaging groove 3a of the tube 3 to prevent the tube 3 from falling out of the tubular joint 1. At this time, the inner periphery of the connected tube 3 is substantially in accord with the inner periphery of the joint body 5.

When the tubular joint 1 or tube 3 in the connected condition as described above is acted on by a separation force, the fall-out stopper 11f engaged with the engaging groove 3a is deformed by the separation force so as to further strengthen the engaged condition and to keep the connected condition of the tubular joint 1 and the tube 3. Since the joint body 5 of tubular joint 1 and the fall-out preventing member 11 are formed of similar resins of olefin or polyacetal series, the manufacturing cost of the tubular joint 1 can be reduced in comparison with conventional tubular joints having fall-out preventing members made of metallic material.

Further, when the tubes 3 including the tubular joints 1 are withdrawn and thereafter the tubular joints 1 and the tubes 3 are used again as raw material for synthetic resin, there is no need to remove the metal-made fall-out preventing members from the tubular joints and separate them as in the conventional manner and the tubular joints 1 can be directly crushed and used as raw material for synthetic resin.

Figure 6:
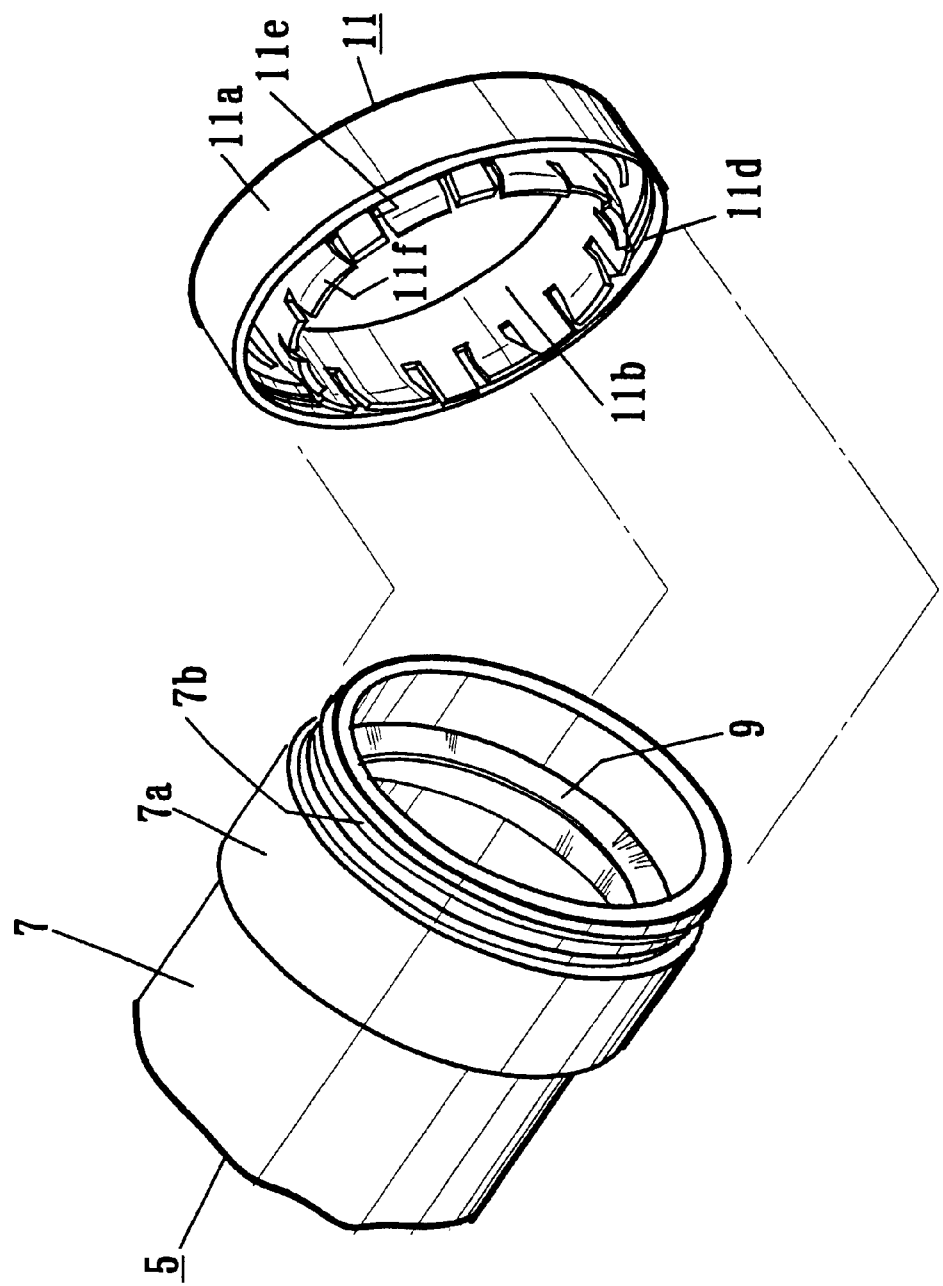
FIG. 6 is a perspective view of another embodiment of a resin-made fall-out preventing member.

In the above description, a plurality of notched parts 11c are circumferentially formed on the outside cylindrical part 11a of the resin-made fall-out preventing member 11. Thereby, the outside cylindrical part 11a comes to be elastically deformable so as to enlarge its diameter when the resin-made fall-out preventing member 11 is pressed into the connection port 7. However, as shown in FIG. 6, the structure may be adapted such that an engaging claw or claws 11d is/are formed on the inner periphery entirely or at a predetermined interval without the provision of the notched parts 11c on the outside cylindrical part 11a.

In this case, since a large force is required to press the resin-made fall-out preventing member 11 into the end part of each connection port 7, a known press may be used for forced press-in of the resin-made fall-out preventing member 11 to engage the engaging claw(s) 11d with the engaging groove 7b.

The Second Embodiment

Figure 7:
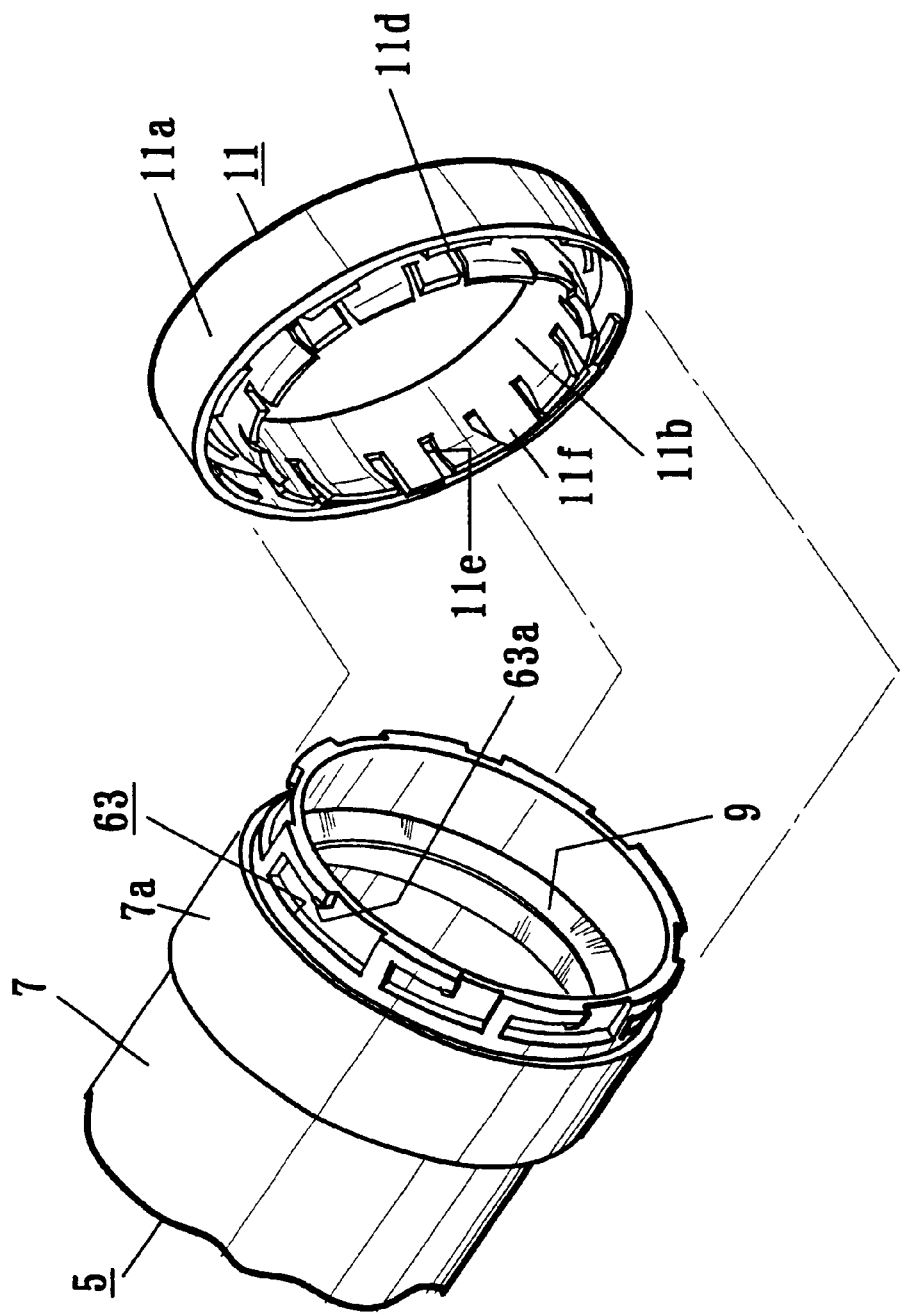
FIG. 7 is a perspective view of a further embodiment of a resin-made fall-out preventing member 11.

This embodiment relates to a structure of fitting a resin-made fall-out preventing member 11 with a turning coupling. Referring to FIG. 7, on the outer periphery of each enlarged part 7a are formed a plurality of receptive parts 63 extending in the axial direction to a predetermined depth and further extending around the axial line to a predetermined width. On the wall at the entrance of each receptive part 63 extending around the axial line is provided a lug 63a. On the other hand, the resin-made fall-out preventing member 11, which comprises an outside cylindrical part 11a and an inside cylindrical part 11b as in the embodiment 1, is integrally provided on the inner surface of the outside cylindrical part 11a with a plurality of engaging claws 11d having a width so as to be capable of entering the receptive part 63.

Into each enlarged part 7a of the tubular joint 1 is inserted the resin-made fall-out preventing member 11 as each engaging claw 11d is positioned to face each receptive part 63 and thereafter rotated clockwise as illustrated, for example.

Then, each engaging claw 11d climbs over each lug 63a and enters each receptive part 63 extending around the axial line, so that the resin-made fall-out preventing member 11 is fixed to each enlarged part 7a.

Besides, as a structure for restricting the returning of the engaging claws 11d that have entered the receptive parts 63, the structure may be adopted such that a cam surface is formed on the wall of the receptive part to restrict the returning due to strengthening of the engaged condition according to the turning of the resin-made fall-out preventing member against the enlarged part.

The Third Embodiment

Figure 8:
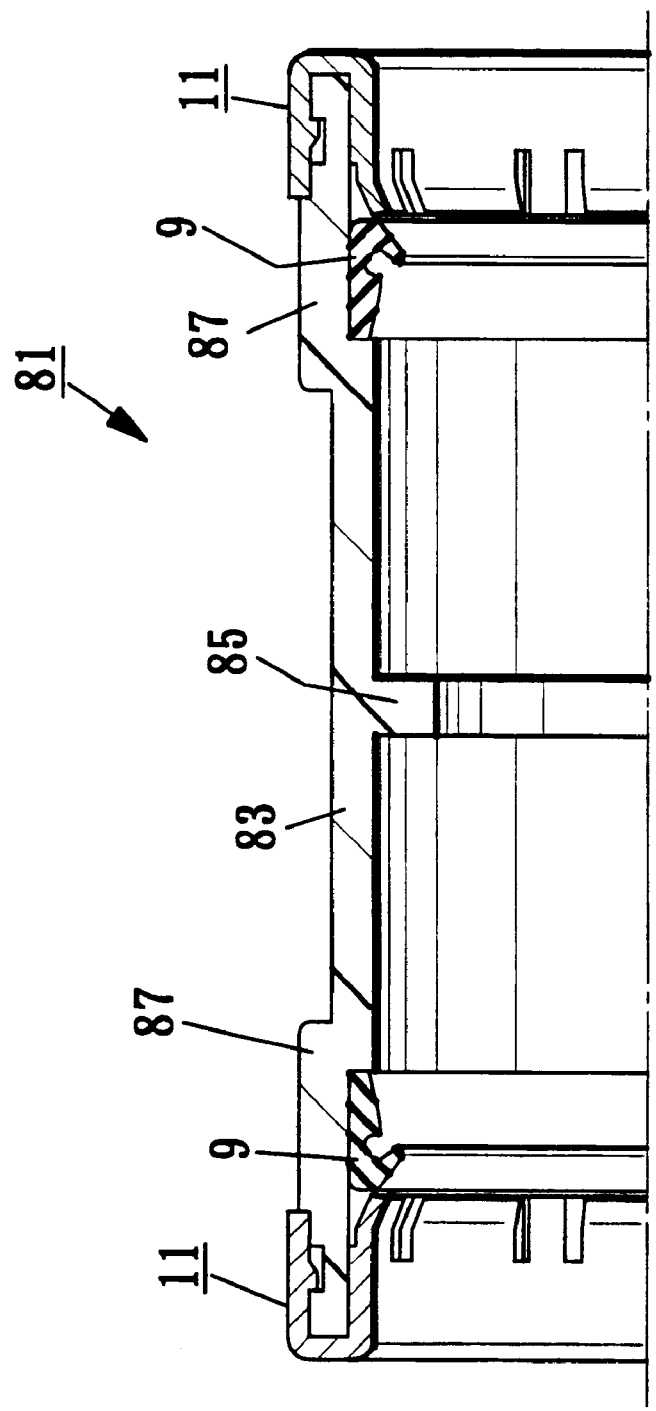
FIG. 8 is a longitudinal sectional view of another embodiment of a tubular joint.

In a tubular joint 81 of this embodiment, as shown in FIG. 8, a joint body 83 having an inner diameter substantially equal to the outer diameter of the tube 3 is integrally provided with a partition 85 having an inner diameter substantially equal to the inner diameter of the tube 3 on the inner periphery in the midway of the joint body 83 in the axial direction. According to this partition 85, the mutual inner surfaces of the tubes 3 may be made substantially in accord with each other. On both ends of the joint body 83 in the axial direction are provided connection ports 87 each having an inner diameter slightly larger than the outer diameter of the tube 3. To the end of each connection port 87 is fitted the above-described resin-made fall-out preventing member 11 to be fixed by press-fitting or turning coupling.

Incidentally, the other components in the embodiments 2 and 3 are similar to those in the embodiment 1, so that they are provided with the same reference numerals and the descriptions of them are omitted.

What is claimed is:

1. A tubular joint adapted to connect a pair of pipes, said tubular joint comprising:

a joint body made of a synthetic resin and having a pair of connection ports integrally formed on respective sides thereof, said connection ports having a diameter slightly larger than an outside diameter of the pipes to be connected such that the pipes to be connected can be inserted and fitted in the connection ports;

a resiliently deformable sealing member integrally formed along an inside circumferential surface of each of the connection ports by injection molding of elastomer resin and adapted to be pressure-fitted to an outside circumferential surface of the respective pipes to be connected as the pipes are inserted and fitted in the connection ports;

an engaging groove formed around an axial line on an outside circumferential surface of each of the connection ports; and a synthetic resin-made fall-out preventing member fixed at an end portion of each of the connection ports and comprising an outside cylindrical portion provided on the outside surface of each of the connection ports and an inside cylindrical portion provided on the inside surface of each of the connection ports;

wherein the outside cylindrical portion of each of the fall-out preventing members has a tapered surface adapted to enable the fall-out preventing members to be press-fitted onto the respective connection ports, and comprises a plurality of engaging portions that are engaged with the engaging groove formed around the axial line on the outside circumferential surface of each of the connection ports as the fall-out preventing members are press-fitted thereon; and wherein the inside cylindrical portion of each of the fall-out preventing members extends toward a center of the connection ports in an inclined manner, and comprises: (i) a plurality of circumferentially formed notched parts spaced at equal intervals, such that the inside cylindrical part is elastically deformable so as to increase a diameter of the inside cylindrical part, and (ii) a plurality of fall-out stoppers whose tip ends are shaped so as to be engaged in a groove portion formed around an axial line on the outside circumferential surface of the respective pipes to be connected as the pipes are inserted and fitted in the connection ports.

2. The tubular joint according to claim 1, wherein the outside cylindrical part of each of the fall-out preventing members also comprises a plurality of circumferentially formed notched parts spaced at equal intervals, such that the outside cylindrical part is elastically deformable so as to increase a diameter of the outside cylindrical part.

3. A tubular joint adapted to connect a pair of pipes, said tubular joint comprising:

a joint body made of a synthetic resin and having a pair of connection ports integrally formed on respective sides thereof, said connection ports having a diameter slightly larger than an outside diameter of the pipes to be connected such that the pipes to be connected can be inserted and fitted in the connection ports;

a resiliently deformable sealing member formed along an inside circumferential surface of each of the connection ports by injection molding of elastomer resin and adapted to be pressure-fitted to an outside circumferential surface of the respective pipes to be connected as the pipes are inserted and fitted in the connection ports;

a plurality of receptive parts formed around an axial line on an outside circumferential surface of each of the connection ports; and a synthetic resin-made fall-out preventing member fixed at an end portion of each of the connection ports and comprising an outside cylindrical portion provided on the outside surface of each of the connection ports and an inside cylindrical portion provided on the inside surface of each of the connection ports;

wherein the outside cylindrical portion of each of the fall-out preventing members comprises a plurality of engaging portions that are adapted to be rotatively engaged with the receptive parts formed around the axial line on the outside circumferential surface of each of the connection ports; and wherein the inside cylindrical portion of each of the fall-out preventing members extends toward a center of the connection ports in an inclined manner, and comprises: (i) a plurality of circumferentially formed notched parts spaced at equal intervals, such that the inside cylindrical part is elastically deformable so as to increase a diameter of the inside cylindrical part, and (ii) a plurality of fall-out stoppers whose tip ends are shaped so as to be engaged in a groove portion formed around an axial line on the outside circumferential surface of the respective pipes to be connected as the pipes are inserted and fitted in the connection ports.

\* \* \* \* \*